(12) United States Patent
Panniello et al.

(10) Patent No.: US 10,003,363 B2
(45) Date of Patent: Jun. 19, 2018

(54) DATA TRANSFER APPARATUS

(71) Applicant: JOHNSON MATTHEY PUBLIC LIMITED COMPANY, London (GB)

(72) Inventors: Marco Panniello, Durham (GB); Emanuele Ronchi, Cleveland (GB); Carl Robert Tipton, North Yorkshire (GB)

(73) Assignee: Johnson Matthey Public Limited Company, London (GB)

( * ) Notice: Subject to any disclaimer, the term of this patent is extended or adjusted under 35 U.S.C. 154(b) by 0 days. days.

(21) Appl. No.: 15/022,322

(22) PCT Filed: Oct. 2, 2014

(86) PCT No.: PCT/GB2014/052984
§ 371 (c)(1),
(2) Date: Mar. 16, 2016

(87) PCT Pub. No.: WO2015/049527
PCT Pub. Date: Apr. 9, 2015

(65) Prior Publication Data
US 2016/0226531 A1 Aug. 4, 2016

(30) Foreign Application Priority Data
Oct. 4, 2013 (GB) .................................. 1317637.5

(51) Int. Cl.
*H04B 13/02* (2006.01)
*H04B 1/04* (2006.01)
(Continued)

(52) U.S. Cl.
CPC ................. *H04B 1/04* (2013.01); *H01Q 1/04* (2013.01); *H04B 13/02* (2013.01); *H04Q 9/00* (2013.01)

(58) Field of Classification Search
CPC . H04B 1/04; H04B 13/02; H04Q 9/00; H01Q 1/04
See application file for complete search history.

(56) References Cited

U.S. PATENT DOCUMENTS

| 4,427,983 | A | 1/1984 | Kruger et al. |
| 4,533,887 | A | 8/1985 | Morz et al. |

(Continued)

FOREIGN PATENT DOCUMENTS

| WO | 2007/034357 A2 | 3/2007 |
| WO | 2013/064838 A1 | 5/2013 |

OTHER PUBLICATIONS

International Search Report, dated Jan. 8, 2015, from corresponding PCT application.

(Continued)

*Primary Examiner* — Jean B Corrielus
(74) *Attorney, Agent, or Firm* — Baker & Hostetler LLP

(57) ABSTRACT

An apparatus for transferring data from a first part of a measuring apparatus to a second part includes a signal transmitting part mounted to the second part and having first antennae for receiving first electrical signals representing data from the second part and emitting electromagnetic radiation corresponding to the first electrical signals, and a signal receiving part mounted to the first part but separated from and rotating relative to the signal transmitting part. The signal receiving part includes a second antenna for receiving electromagnetic radiation and generating second electrical signals corresponding to the first electrical signals. The signal transmitting part and the signal receiving part include respective radiation guide elements adapted to cause less attenuation of the electromagnetic radiation passing through the radiation guide elements than when passing through water, so that the electromagnetic radiation can be continu- (Continued)

ously transmitted from the signal transmitting part to the signal receiving part.

17 Claims, 3 Drawing Sheets

(51) Int. Cl.
*H04Q 9/00* (2006.01)
*H01Q 1/04* (2006.01)

(56) References Cited

U.S. PATENT DOCUMENTS

| | | | |
|---|---|---|---|
| 4,796,183 A | 1/1989 | Ermert et al. | |
| 4,988,195 A * | 1/1991 | Doyle | G01N 21/552 356/244 |
| 6,710,860 B1 * | 3/2004 | Harris | G01P 1/00 356/138 |
| 6,751,560 B1 * | 6/2004 | Tingley | G01N 22/02 702/51 |
| 7,949,310 B2 * | 5/2011 | Rofougaran | H01P 1/20372 333/108 |
| 2007/0063785 A1 | 3/2007 | Krumme et al. | |
| 2007/0146219 A1 * | 6/2007 | Rhodes | H01Q 1/34 343/719 |
| 2010/0309013 A1 * | 12/2010 | Liess | G01N 21/53 340/693.6 |
| 2012/0105246 A1 * | 5/2012 | Sexton | H04B 13/02 340/850 |
| 2012/0133542 A1 * | 5/2012 | Ben-Shmuel | H01Q 19/18 342/5 |
| 2012/0275566 A1 * | 11/2012 | Hunter | G01N 23/04 378/62 |
| 2013/0213638 A1 * | 8/2013 | Keller | C04B 28/02 166/248 |
| 2013/0343746 A1 * | 12/2013 | Weichert | H04B 10/071 398/16 |
| 2014/0013982 A1 * | 1/2014 | Meir | B01J 19/126 102/205 |
| 2014/0050242 A1 * | 2/2014 | Taylor | H01L 29/0688 372/45.012 |

OTHER PUBLICATIONS

United Kingdom Combined Search and Examination Report GB1417451.0 dated Nov. 18, 2014.
United Kingdom Search Report GB1317632.6 dated Mar. 10, 2014.

* cited by examiner

DATA TRANSFER APPARATUS

The present invention relates to a data transfer apparatus, and relates particularly, but not exclusively, to a data transfer apparatus for transferring data from an undersea pipeline inspection apparatus to a surface vessel.

Subsea pipeline integrity inspection apparatus is known which uses gamma radiation to carry out tomographic inspections of pipes. Such an apparatus is typically constructed from two main parts, i.e. a stationary part that clamps onto the pipe, and an inner rotating part that continuously captures data from gamma radiation detectors. The tool is deployed from a ship using an underwater remotely operated vehicle (ROV) and the data from the rotating part of the tool must be relayed to the stationary clamped part of the tool before being relayed back to the surface vessel via the ROV.

The transfer of data from the rotating part of the apparatus to the stationary part causes the difficulty that because part of the apparatus is continuously rotating while in operation, a wired connection cannot be used. The use of slip rings, which is known in other types of rotating device, is also not feasible because of the presence of a pipe being scanned.

It is known to carry out data transfer using radio frequency electromagnetic radiation. However, this arrangement suffers from the drawback that the relatively low frequency used (4 MHz) results in a low data transfer rate (approximately 30 kB/s). However, attempts to use a shorter wavelength create the difficulty that the electromagnetic radiation has a very short range in water, as a result of which a large number of transmitters and receivers would need to be used, thereby making the apparatus more complicated and expensive.

Preferred embodiments of the present invention seek to overcome one or more of the above disadvantages of the prior art.

According to an aspect of the present invention, there is provided a data transfer apparatus for transferring data from a first part of a measuring apparatus to a second part of the measuring apparatus when the first part is rotating relative to the second part, the data transfer apparatus comprising:

at least one signal transmitting part adapted to be mounted to the first part of the measuring apparatus and having at least one first antenna for receiving first electrical signals representing data from the first part and to emit electromagnetic radiation corresponding to said first electrical signals; and at least one signal receiving part adapted to be mounted to the second part of the measuring apparatus such that the signal receiving part is separated from and capable of rotation relative to the or each said signal transmitting part, wherein at least one said signal receiving part comprises at least one second antenna for receiving said electromagnetic radiation and generating second electrical signals corresponding to said first electrical signals;

wherein at least one said signal transmitting part and/or at least one said signal receiving part includes respective radiation guide means adapted to cause less attenuation of said electromagnetic radiation passing through said radiation guide means than when passing through water, said electromagnetic radiation can be continuously transmitted from at least one said signal transmitting part to at least one said signal receiving part, and at least some of said electromagnetic radiation is transmitted from a said first antenna to a said second antenna via a path including at least one said radiation guide means.

By providing radiation guide means adapted to cause less attenuation of the electromagnetic radiation passing through the radiation guide means than when passing through water, such that the electromagnetic radiation can be continuously transmitted from at least one signal transmitting part to at least one signal receiving part, and least some of said electromagnetic radiation is transmitted from a first antenna to a second antenna via a path including at least one radiation guide means, this provides the advantage of enabling the gap between the radiation guide means and the corresponding signal transmitting part or signal receiving part separated therefrom to be sufficiently small to allow radiation of shorter wavelength to be used, while allowing continuous data transfer. This in turn enables significantly more rapid data transfer. The invention provides the further advantage that electromagnetic radiation at microwave frequencies can be used, thereby enabling the use of standard wi-fi protocols. This in turn reduces the cost of the apparatus.

The measuring apparatus of the invention may be adapted to be used whilst immersed in water. The measuring apparatus therefore may be an underwater or subsea measuring apparatus. In particular the measuring apparatus of the invention may be adapted to be used when a gap between the signal transmitting part and the signal receiving part is, at least partially, filled by water.

In use the signal transmitting part may be separated from the or each signal receiving part by a gap. The distance between the signal transmitting part and the or each signal receiving part may be in the range from about 0.1 mm to about 50 mm. The distance between the signal transmitting part and the or each signal receiving part may be in the range from about 0.5 mm to about 20 mm. As mentioned above, in use the gap may be filled by water.

In a preferred embodiment, (i) at least one said signal transmitting part is adapted to receive electromagnetic radiation corresponding to data from at least one said signal receiving part, and/or (ii) at least one said signal receiving part is adapted to transmit electromagnetic radiation corresponding to data to at least one said signal transmitting part.

This provides the advantage of allowing bidirectional communication between the apparatus and a surface vessel without the use of additional equipment, for example to enable measurement data to be transmitted from the apparatus to the vessel, and control data to be transmitted from the vessel to the apparatus.

The apparatus may comprise means for reducing the loss of electromagnetic radiation form parts of the signal transmitting part and/or parts of the signal receiving part which do not face the other of said signal transmitting part or signal receiving part. Such means may include a conductive coating or layer covering such non-facing parts.

The apparatus may further comprise reflective means for reflecting at least part of said electromagnetic radiation travelling towards a surface of at least one said signal transmitting part and/or at least one said signal receiving part.

This provides the advantage of enabling signal loss through surfaces not facing the radiation communication path through the water to be minimised, thereby increasing efficiency of operation of the apparatus.

The reflective means may comprise at least one reflective coating on at least one said signal transmitting part and/or at least one said signal receiving part.

The reflective means may be provided on at least one said signal transmitting part and may be adapted to direct at least some of said electromagnetic radiation towards at least one said signal receiving part.

This provides the advantage of further increasing the efficiency of operation of the apparatus.

At least one said signal transmitting part may have an internal profile adapted to direct at least some of said electromagnetic radiation towards at least one said signal receiving part.

At least one said radiation guide means may form a closed loop in use.

At least one said radiation guide means may be substantially annular in use.

At least one said radiation guide means may have a cross section which is square, rectangular, or rounded, e.g. circular or elliptical. The use of a cross section which focuses electromagnetic radiation towards another radiation guide may be beneficial. Such focusing of the electromagnetic waves may be achieved, for example, by using a radiation guide having a parabolic cross section.

The signal transmitting part and/or the signal receiving part may be formed in two or more portions which may be assembled together in use. In this form, the portions may be assembled to form a closed loop or annulus, for example. It may be convenient to provide the signal transmitting part and/or the signal receiving part in portions when they are intended to fit around a structure in use. For example, portions forming said signal transmitting part and/or the signal receiving part may be provided in the form of inserts mounted to the first and/or second parts of the measuring apparatus. When said first or second part of said measuring apparatus is intended to surround the structure to be measured by opening around the structure and then closing to partially or wholly surround the structure, the portions of the signal transmitting part and/or the signal receiving part may form the signal transmitting part and/or the signal receiving part when the relevant part of the measuring apparatus is closed. The portions may be joined or hinged to each other by means of a joining part, for example a hinge, formed from the same material as the portions, in order to present as homogeneous a radiation transmitting medium as possible.

At least one said signal transmitting part and at least one said signal receiving part may each comprise a respective said radiation guide means.

This provides the advantage of improving the reliability and efficiency of data transfer.

At least one said radiation guide means may comprise at least one material having a relative permittivity less than that of water. Suitable materials may have a relative permittivity less than 10. Said at least one material may have a relative permittivity less than 5.

Said at least one material preferably has a low water absorption factor. Said at least one material preferably has a water absorption factor less than 10 weight %. Said at least one material preferably has a water absorption factor less than 1 weight %.

At least one said radiation guide means may comprise a plastics material and/or at least one rubber material. An example of a suitable plastics material includes polyethylene.

At least one said radiation guide means may be adapted to transmit and/or receive at least part of said electromagnetic radiation in a direction substantially parallel to an axis of rotation of said first part relative to said second part.

The apparatus may be adapted to generate said electromagnetic radiation having a frequency of 0.3 GHz to 300 GHz.

The apparatus may be adapted to generate said electromagnetic radiation having a frequency of 2 GHz to 11 GHz.

The apparatus may be adapted to generate said electromagnetic radiation having a frequency of 2.4 GHz to 2.5 GHz.

According to another aspect of the present invention, there is provided a measuring apparatus comprising (i) a first part adapted to be mounted to an object, (ii) a second part adapted to be rotatably mounted relative to said object and having at least one radiation source for causing electromagnetic radiation to pass through said object, and at least one radiation detector for detecting electromagnetic radiation passing through said object, and (iii) a data transfer apparatus as defined above.

A preferred embodiment of the invention will now be described, by way of example only and not in any limitative sense, with reference to the accompanying drawings, in which.

Figure 1:
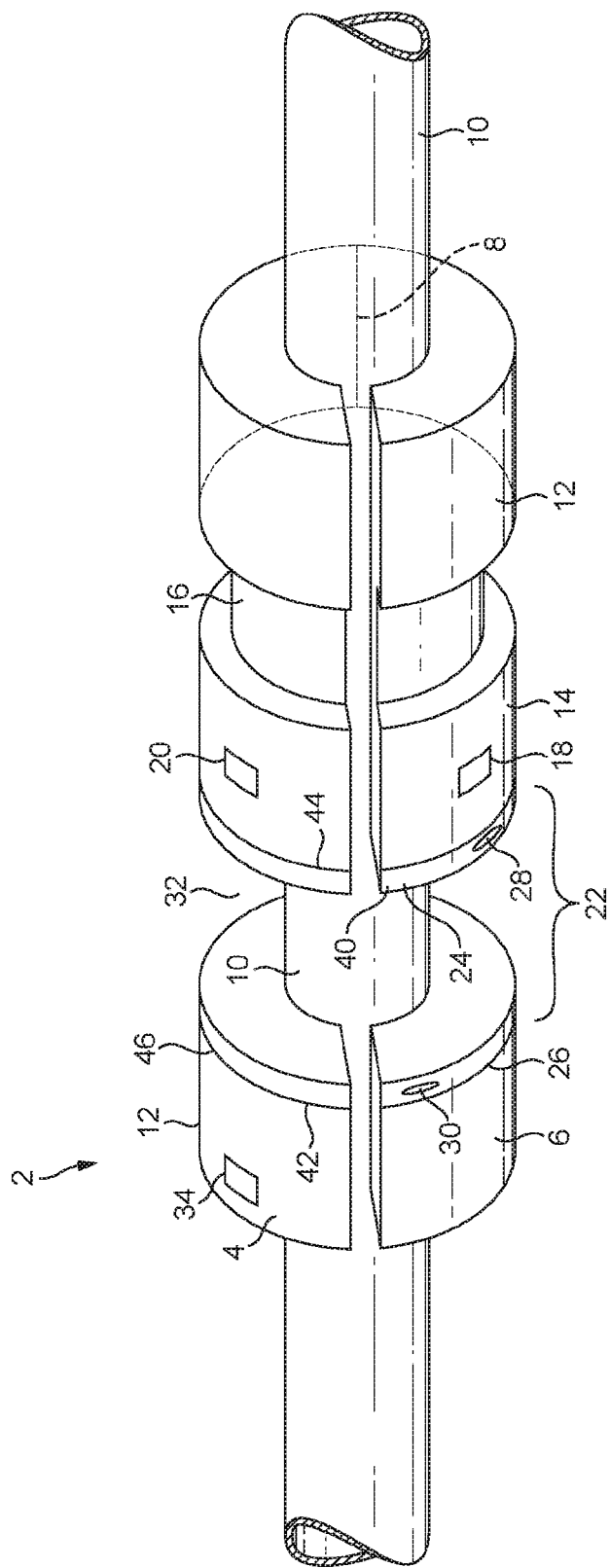
FIG. 1 is a schematic view of an undersea pipeline integrity inspection apparatus embodying the present invention.

Referring to FIG. 1, a pipeline integrity inspection apparatus 2 embodying the present invention is formed from a pair of clam shells 4, 6 hinged together at hinge 8 for clamping around a pipeline 10 to be inspected. The inspection apparatus 2 has a first part 12 and a second part 14 rotatably mounted to the first part 12 and driven by means of a motor 16 connecting the first 12 and second 14 parts.

The second part 14 has a gamma radiation source 18 and an array of gamma radiation detectors 20 arranged on an opposite side of the second part 14 from the source 18 such that radiation travelling from the source 18 to the detectors 20 passes through the pipeline 10. Rotation of the second part 14 relative to the pipeline 10 enables a 3 dimensional model of the pipeline 10 to be formed, including data representing the condition of the pipeline surface and the thickness of any deposits on the inside of the pipeline 10. Data obtained during the pipeline inspection process is stored in a suitable memory (not shown) on the second part 14.

A data transfer apparatus 22 has a signal transmitting part 24 and a signal receiving part 26. The signal transmitting part 24 has an internal diameter of 500 mm, an outer diameter of 560 mm and an axial length of 30 mm, and is mounted to the second part 14 for rotation therewith.

The signal transmitting part 24 is formed from a plastics material having low relative permittivity and low water absorption, such as polyethylene. The signal transmitting part 24 is formed as a pair of inserts mounted to the second part 14 such that the inserts separate when the clam shells 4, 6 are pivoted to their open position, and form a closed ring when the clam shells 4, 6 are clamped together. Alternatively, the inserts may be hinged to each other by means of a hinge formed from the same material as the inserts, in order to present as homogeneous a radiation transmitting medium as possible, or the signal transmitting part 24 and signal receiving part 26 may be mounted to the second 14 and first 12 parts respectively after removal of the inspection apparatus 2 from the pipeline 10.

Figure 2:
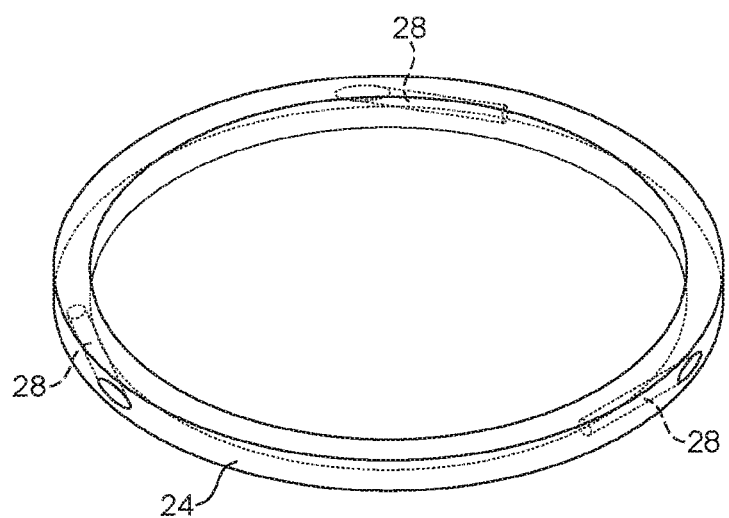
FIG. 2 is a perspective view of a signal transmitting part of a data transfer apparatus of the apparatus of FIG. 1.
Figure 3:
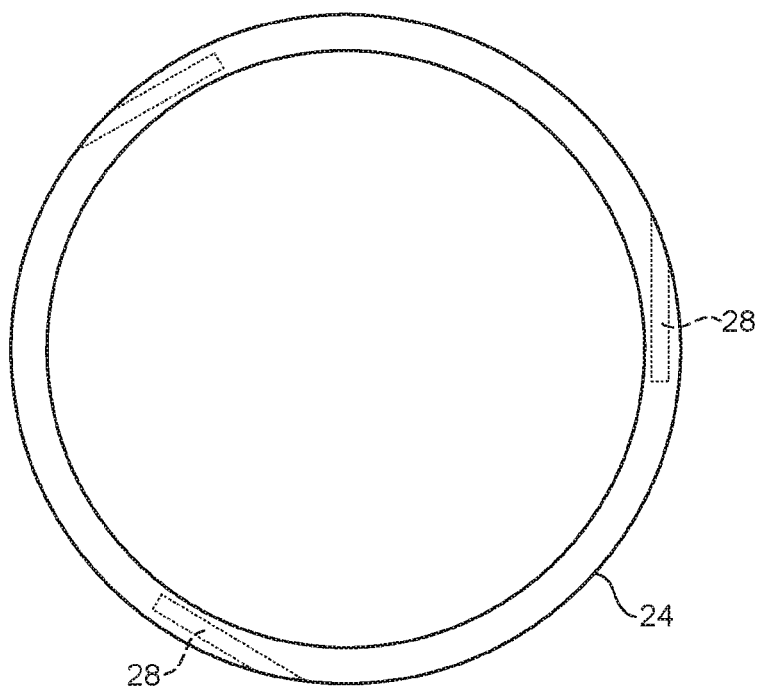
FIG. 3 is a top view of the signal transmitting part of FIG. 2.

The signal transmitting part 24 includes three antennae 28 embedded within the ring of plastics material and equiangularly spaced around the circumference of the ring, as shown in greater detail in FIGS. 2 and 3.

The signal receiving part 26 is mounted to the first part 12 and includes a single antenna 30 embedded within a ring of plastics material having similar construction to that of the signal transmitting part 24 and is spaced axially by a gap 32 of length of the order of 5 mm from the signal transmitting part 24. Data received by the antenna 30 is converted into electrical signals which are stored in a suitable memory (not shown) on the first part 12 and is transferred to a remotely operated vehicle (ROV) by means of a suitable connector 34.

The signal transmitting part 24 and signal receiving part 26 are also arranged such that wireless signals can be transmitted from the signal receiving part 26 to the signal transmitting part 24. This enables control data to be transmitted to the second part 14 from the ROV.

Circumferential surfaces 40, 42 of the signal transmitting part 24 and signal receiving part 26, respectively, and axial surfaces 44, 46 of the signal transmitting part 24 and signal receiving part 26 respectively facing away from the gap 32 are provided with reflective means in the form of coatings of conductive metallic material such as aluminium. This causes internal reflection of radiation inside the signal transmitting part 24 and signal receiving part 26, thereby minimising the extent to which radiation escapes through the surfaces 40, 42, 44, 46 and is attenuated in the water. This in turn maximises the efficiency of transmission through the axial surfaces facing the gap 32.

The operation of the apparatus 2 of FIG. 1 will now be described.

In order to carry out pipeline integrity inspection of the pipeline 10, the two clam shells 4, 6 of the apparatus 2 are opened and located around the pipeline 10 by means of a remotely operated vehicle (not shown). The clam shells 4, 6 are then closed and clamped together and the second part 14 rotated relative to the first part 12 by means of the motor 16 until sufficient data representing the condition of the pipeline walls and the thickness of any deposits formed within the pipeline 10 is obtained.

In order to transfer data obtained from the inspection process to a surface vessel, data stored in the second part 14 of the apparatus 2 is transmitted to the antennae 28 of the signal transmitting part 24, as a result of which electromagnetic radiation is transmitted around the ring of the signal transmitting part 24 with low attenuation and transmitted into the water in the gap 32 separating the signal transmitting part 24 and signal receiving part 26 with high attenuation. As a result of the large difference in refractive index of the plastic material and sea water, a large proportion of the radiation is reflected from the internal walls of the ring, but some radiation leaks from the ring into the water in the gap 32. Electromagnetic radiation reaching the signal receiving part 26 is similarly transmitted around the ring of the signal receiving part 26 with low attenuation and is thereby reaches the antenna 30 in the signal receiving part 26. The gap 32 across which the electromagnetic radiation must travel is sufficiently small that data can be continuously transferred between the signal transmitting part 24 and the signal receiving part 26 while the second part 14 rotates relative to the first part 12. The antenna 30 in the signal receiving part 26 then converts the received signals to electrical signals from which the pipeline inspection data can be extracted and stored in a suitable memory on the first part 12. The data can then be transferred to a remotely operated vehicle by means of the connector 34.

Figure 4:
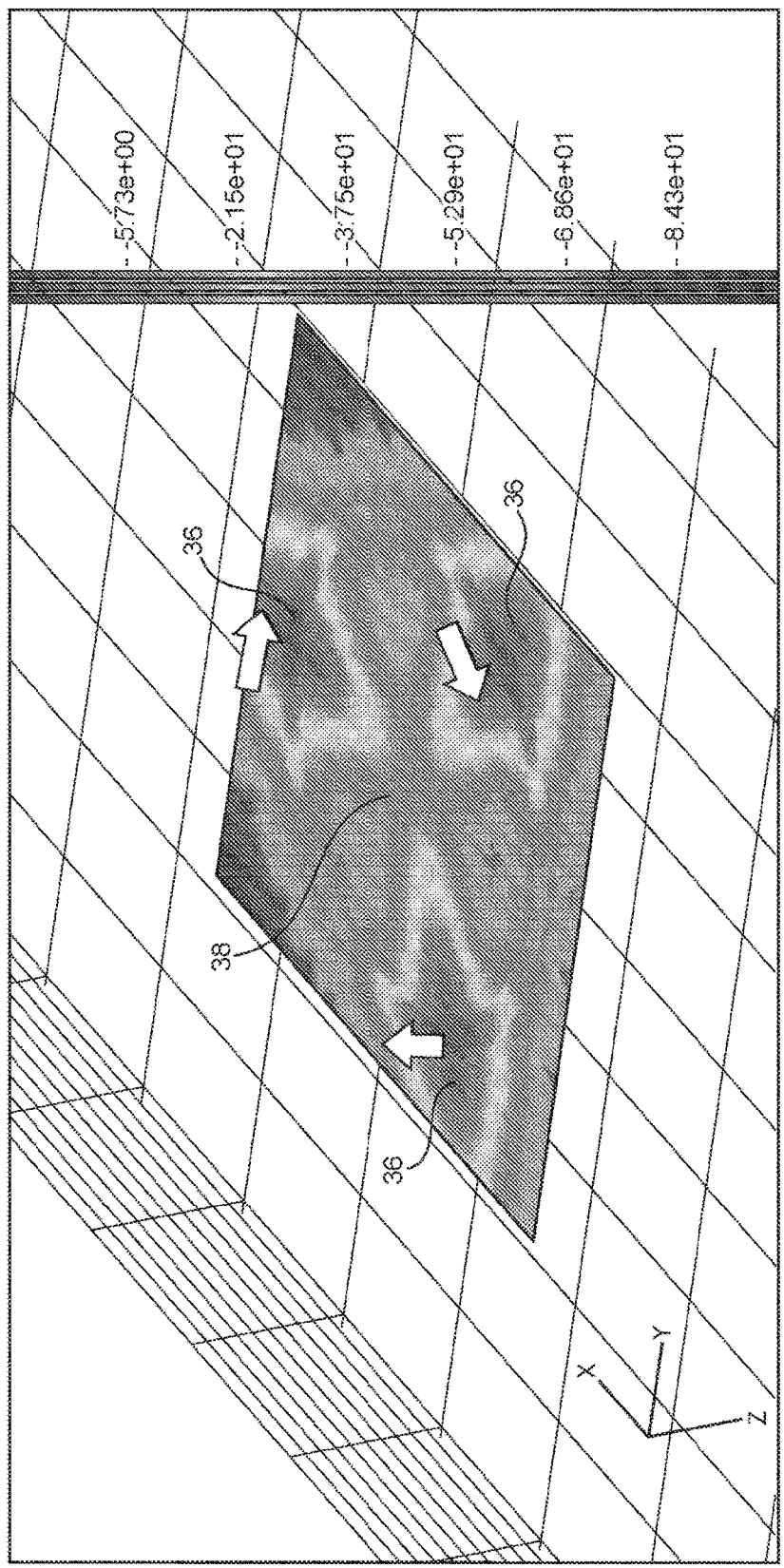
FIG. 4 is a finite element model of operation of the data transfer apparatus of the inspection apparatus of FIG. 1.

Referring to FIG. 4, the results of a finite element model of the signal transmitting part 24 and signal receiving part 26 of FIG. 1 for a total output power of the antennae 28 of 100 mW (the output power of a standard Wi-Fi router) and having a separation of 10 mm between the rings is shown. The predicted electric field transferred across the gap 3 between the signal transmitting part 24 and signal receiving part 26 is shown, with regions 36 of high electric field intensity and regions 38 where the electric field intensity is less strong than in regions 36 but is sufficient for Wi-Fi communication. It can therefore be seen that the regions 38 of sufficient electric field intensity are effectively increased in size, thereby preventing the gap 32 between the signal transmitting part 24 and signal receiving part 26 becoming large enough to prevent data communication at any part of the rotation cycle of the first part 12 relative to the second part 14.

Experimental testing of a pair of waveguides forming the signal transmitting part 24 and signal receiving part 26 of the apparatus 2 of FIG. 1 clamped with a separation of 5 mm and immersed in a tank of salt water showed that a data rate of between 1.5 MB/s and 2.5 MB/s is possible, thereby enabling the use of conventional Wi-Fi protocols around the IEEE 802.11 standards.

It will be appreciated by persons skilled in the art that the above embodiment has been described by way of example only, and not in any limitative sense, and that various alterations and modifications are possible without departure from the scope of the invention as defined by the appended claims.

The invention claimed is:

1. A subsea data transfer apparatus for subsea transfer of data from a first part of a subsea measuring apparatus to a second part of the subsea measuring apparatus when the first part is rotating relative to the second part, the data transfer apparatus comprising:

at least one signal transmitter mounted to the first part of the subsea measuring apparatus and having at least one first antenna for receiving first electrical signals representing data from the first part and emitting data-carrying electromagnetic radiation corresponding to said first electrical signals; and at least one signal receiver mounted to the second part of the subsea measuring apparatus such that the at least one signal receiver is separated from and rotates relative to the, or each one of the, at least one signal transmitter, wherein said at least one signal receiver comprises at least one second antenna for receiving said data-carrying electromagnetic radiation and generating second electrical signals corresponding to said first electrical signals;

wherein, with said first part and said second part located within water beneath sea surface, said at least one signal transmitter and/or said at least one signal receiver includes respective radiation guide adapted to cause less attenuation of said data-carrying electromagnetic radiation passing through said radiation guide than when passing through the water, said data-carrying electromagnetic radiation continuously transmitted from said at least one signal transmitter to said at least one signal receiver, and at least some of said data-carrying electromagnetic radiation is transmitted from said first antenna to said second antenna via a path including said at least one radiation guide.

2. The subsea data transfer apparatus according to claim 1, wherein (i) said at least one signal transmitter is adapted to receive second data carrying electromagnetic radiation corresponding to data from said at least one signal receiver, and/or (ii) said at least one signal receiver is adapted to transmit the second data-carrying electromagnetic radiation to said at least one signal transmitter.

3. The subsea data transfer apparatus according to claim 1, further comprising a reflector for reflecting at least part of said data-carrying electromagnetic radiation travelling towards a surface of said at least one signal transmitter and/or said at least one signal receiver.

4. The subsea data transfer apparatus according to claim 3, wherein the reflector comprises at least one reflective coating on said at least one signal transmitter and/or said at least one signal receiver.

5. The subsea data transfer apparatus according to claim 3, wherein the reflector is provided on said at least one signal transmitter and is adapted to direct at least some of said data-carrying electromagnetic radiation towards said at least one signal receiver.

6. The subsea data transfer apparatus according to claim 1, wherein said at least one signal transmitter has an internal profile adapted to direct at least some of said data-carrying electromagnetic radiation towards said at least one signal receiver.

7. The subsea data transfer apparatus according to claim 1, wherein said at least one radiation guide forms a closed loop.

8. The subsea data transfer apparatus according to claim 7, wherein said at least one radiation guide is substantially annular.

9. The subsea data transfer apparatus according to claim 1, wherein said at least one signal transmitter and at least one signal receiver each comprises said respective radiation guide.

10. An apparatus according to claim 1, wherein said at least one radiation guide comprises at least one plastic material and/or at least one rubber material.

11. The subsea data transfer apparatus according to claim 1, wherein at least one radiation guide is adapted to transmit and/or receive at least part of said data-carrying electromagnetic radiation in a direction substantially parallel to an axis of rotation of said first part relative to said second part.

12. The subsea data transfer apparatus according to claim 1, wherein the apparatus is adapted to generate said data-carrying electromagnetic radiation having a frequency of 0.3 GHz to 300 GHz.

13. The subsea data transfer apparatus according to claim 12, wherein the apparatus is adapted to generate said data-carrying electromagnetic radiation having a frequency of 2 GHz to 11 GHz.

14. The subsea data transfer apparatus according to claim 13, wherein the apparatus is adapted to generate said data-carrying electromagnetic radiation having a frequency of 2.4 GHz to 2.5 GHz.

15. The subsea data transfer apparatus according to claim 2, further comprising a reflector for reflecting at least part of said data-carrying electromagnetic radiation and/or said second data-carrying electromagnetic radiation travelling towards a surface of at least one signal transmitting part and/or said at least one signal receiver.

16. The subsea data transfer apparatus according to claim 4, wherein the reflector is provided on said at least one signal transmitter and is adapted to direct at least some of said data-carrying electromagnetic radiation towards at least one said signal receiving part.

17. A subsea measuring apparatus comprising (i) a first part for mounting on an object, (ii) a second part rotatably mounted on said first part and having at least one radiation source for causing data-carrying electromagnetic radiation to pass through said object, and at least one radiation detector for detecting the data-carrying electromagnetic radiation passing through said object, and (iii) a subsea data transfer apparatus comprising:
 at least one signal transmitter mounted to the first part of the subsea measuring apparatus and having at least one first antenna for receiving first electrical signals representing data from the first part and emitting the data-carrying electromagnetic radiation corresponding to said first electrical signals; and
 at least one signal receiver mounted to the second part of the subsea measuring apparatus such that the at least one signal receiver is separated from and rotates relative to the, or each one of the, at least one signal transmitter, wherein said at least one signal receiver comprises at least one second antenna for receiving said data-carrying electromagnetic radiation and generating second electrical signals corresponding to said first electrical signals;
 wherein, with said first part and said second part located within water beneath sea surface, said at least one signal transmitter and/or said at least one signal receiver includes respective radiation guide adapted to cause less attenuation of said data-carrying electromagnetic radiation passing through said radiation guide than when passing through the water, said data-carrying electromagnetic radiation continuously transmitted from said at least one signal transmitter to said at least one signal receiver, and at least some of said data-carrying electromagnetic radiation is transmitted from said first antenna to said second antenna via a path including said at least one radiation guide.

* * * * *